UNITED STATES PATENT OFFICE.

ALBERT WILHELM REHNSTRÖM, OF MALHAMMAR, ASSIGNOR TO AKTIE-BOLAGET LACTOSERIN, OF STOCKHOLM, SWEDEN.

FOOD PRODUCT.

SPECIFICATION forming part of Letters Patent No. 412,593, dated December 9, 1890.

Application filed July 11, 1889. Serial No. 317,230. (No specimens.) Patented in Sweden March 7, 1888, No. 1,407, and in England April 3, 1888, No. 12,691.

*To all whom it may concern:*

Be it known that I, ALBERT WILHELM REHNSTRÖM, a subject of the King of Sweden, and a resident of Malhammar, Rekarne, in the Kingdom of Sweden, have invented a new Food Product and a Process for Preparing the Same, (for which I have obtained patents in Sweden, No. 1,407, dated March 7, 1888, and in Great Britain, No. 12,691, dated April 3, 1888,) of which the following is a full, clear, and exact description.

My new food is prepared from milk-whey and milk. Both these ingredients may of course be used in different proportions—as, for instance, one hundred volumes of whey together with fifteen to fifty volumes of skim-milk, or fifty volumes of whey together with sixty-five to one hundred volumes of skim-milk, these being the most suitable proportions for general purposes; but I wish it to be clearly understood that I do not limit my invention to precisely any of the above-mentioned proportions, because other proportions may also be used.

The manner of producing the food product consists in a series of evaporating, cooling, drying, cutting or crushing, and grinding and roasting the ingredients. The evaporation may be carried out in any suitable vessel, care only being taken that the evaporated product does not get burned nor soiled by the vessel in question. It is therefore advisable to use a well-tinned and thoroughly-cleansed copper vessel for the evaporation and to heat the same by steam let into a jacket provided around said vessel at about twenty pounds pressure per square inch. The quantity of whey to be used is poured into the vessel and the heating commenced. The casein and albumen, which at the first stages of the operation separate themselves from the body of the liquid, are carefully skimmed off and kept for re-adding later on. When the whey is reduced to about half of its original volume, the desired proportion of skim-milk is added, and when this mass has thickened to a tolerable density the previously-skimmed off casein and albumen are added after having been well stirred or whipped. During the evaporation the mass should be set in agitation, and this stirring should be increased by degrees as the mass thickens. When the latter has obtained the consistency of paste, the evaporation is terminated and the mass taken out of the vessel.

In such cases where it may be preferred that the product should contain more fat than is got by using whey and skim-milk, the desired amount of fat, animal or vegetable, is added and carefully mixed in when the liquid has been evaporated to two-thirds of its original volume.

The evaporated mass should be of a light yellow color, and after taking it from the evaporation-vessel it should be vigorously worked in a suitable vessel for the sake of counteracting any stronger crystallization of the milk-sugar. This working process is continued until the mass has cooled down and become duly coherent. When properly cool, the mass is formed in any adaptable manner into suitably-sized cakes or pieces. One-quarter meter square or diameter and one and one-half centimeter thickness are, for instance, recommendable dimensions for the cakes. These cakes or pieces are afterward dried upon shelves in a well-ventilated chamber having a temperature of + 15° to + 20° centigrade. When dried in the air, the cakes or pieces are rather brittle and fragile, of a yellowish white color, tending somewhat toward gray. When containing predominantly skim-milk, they are tending more to white. The cakes or pieces may also be dried in warm air not exceeding 100° centigrade. Said cakes or pieces are afterward broken by means of any suitable apparatus to the size of small peas or beans, to remain in such shape for further roasting, as described hereinafter, or again dried in a temperature of 20° to 40° centigrade. When the grains are so dry that they crumble to meal at a slight pressure by the fingers, they are ground and duly sifted. The product is afterward roasted best spread upon white paper or upon thin white cloth stretched between suitable tenters. The temperature must not be so high as to damage the paper or cloth, preferably not exceeding 120° to 125° centigrade. It is advisable that the grains during the process of roasting are kept in constant agitation, and said roasting may with advantage be performed in several turns with appropriate intervals. The roasting can be done in any kind of suitable ovens.

Previous to the roasting the substance has a peculiar raw smell, which must be absolutely removed by the roasting operation. When the substance, on the contrary, after the roasting operation feels very dry and issues forth immediately after coming out of the roasting-oven a mild agreeable smell resembling the smell of boiled milk, the roasting is sufficient.

This product prepared in the manner now described is especially adapted for use not only in families in daily house-keeping in the preparations of divers soups and dishes and as a convenient and palatable ingredient in numerous foods or beverages mixed with cocoa, starch, sugar, vanilla, flour, &c., but is also especially useful as a food for babies. The sanitary advantages of this food product will also render it particularly desirable for use in military cooking during campaigns or in camps, as well as on board ships, and as a diet for invalids and sick persons, as well as an agreeable drink when mixed with boiled milk.

If the cakes or pieces when first broken, as hereinbefore described, to the size of small peas or coffee-beans are allowed to remain so and roasted to a more or less brown color are mixed with coffee-beans or cocoa or other suitable flavoring substances, the product, when afterward duly ground, can be used as a substitute for coffee. It is naturally understood that my new food product as here described (not in its last-mentioned harder roasted form, however, which is only suitable as a surrogate for coffee) may be mixed in with several ingredients in order to arrive at a certain taste and so to suit certain purposes, such as, for instance, vanilla, cocoa, starch, sugar, flour, or several others.

Having thus described my invention, what I claim is—

The herein-described food-product, consisting of dried and roasted whey and milk, substantially as and in the proportions described.

In witness whereof I have hereunto signed my name in the presence of two subscribing witnesses.

ALBERT WILHELM REHNSTRÖM.

Witnesses:
NERE A. ELFWING,
WM. W. PALMER.